United States Patent

Dobler et al.

[11] Patent Number: 6,128,116
[45] Date of Patent: *Oct. 3, 2000

[54] RETROREFLECTIVE ELEVATOR HOISTWAY POSITION SENSOR

[75] Inventors: August J. Dobler, West Simsbury, Conn.; D. Richard Schafer, Easthampton, Mass.; Julian H. Shull, Southington, Conn.

[73] Assignee: Otis Elevator Company, Farmington, Conn.

[*] Notice: This patent is subject to a terminal disclaimer.

[21] Appl. No.: 09/001,491

[22] Filed: Dec. 31, 1997

[51] Int. Cl.[7] .............................. H04B 1/38; H04B 10/10; B66B 3/02
[52] U.S. Cl. ......................... 359/144; 187/391; 359/169
[58] Field of Search .................... 359/152, 154, 359/144, 169, 170

[56] References Cited

U.S. PATENT DOCUMENTS

| | | | |
|---|---|---|---|
| 5,304,751 | 4/1994 | Skalksi et al. | 187/115 |
| 5,889,239 | 3/1999 | Blackaby et al. | 187/391 |
| 5,931,264 | 8/1999 | Gillingham et al. | 187/406 |

Primary Examiner—Jason Chan
Assistant Examiner—Agustin Bello

[57] ABSTRACT

Retroreflective tape 28, 29 disposed on select positions on an elevator guide rail 13 is sensed by infrared transceivers 24, 25 disposed on an elevator car 10 to provide a signal indicative of the elevator as being at a vertical position in a hoistway designated by said retroreflective tape.

8 Claims, 1 Drawing Sheet

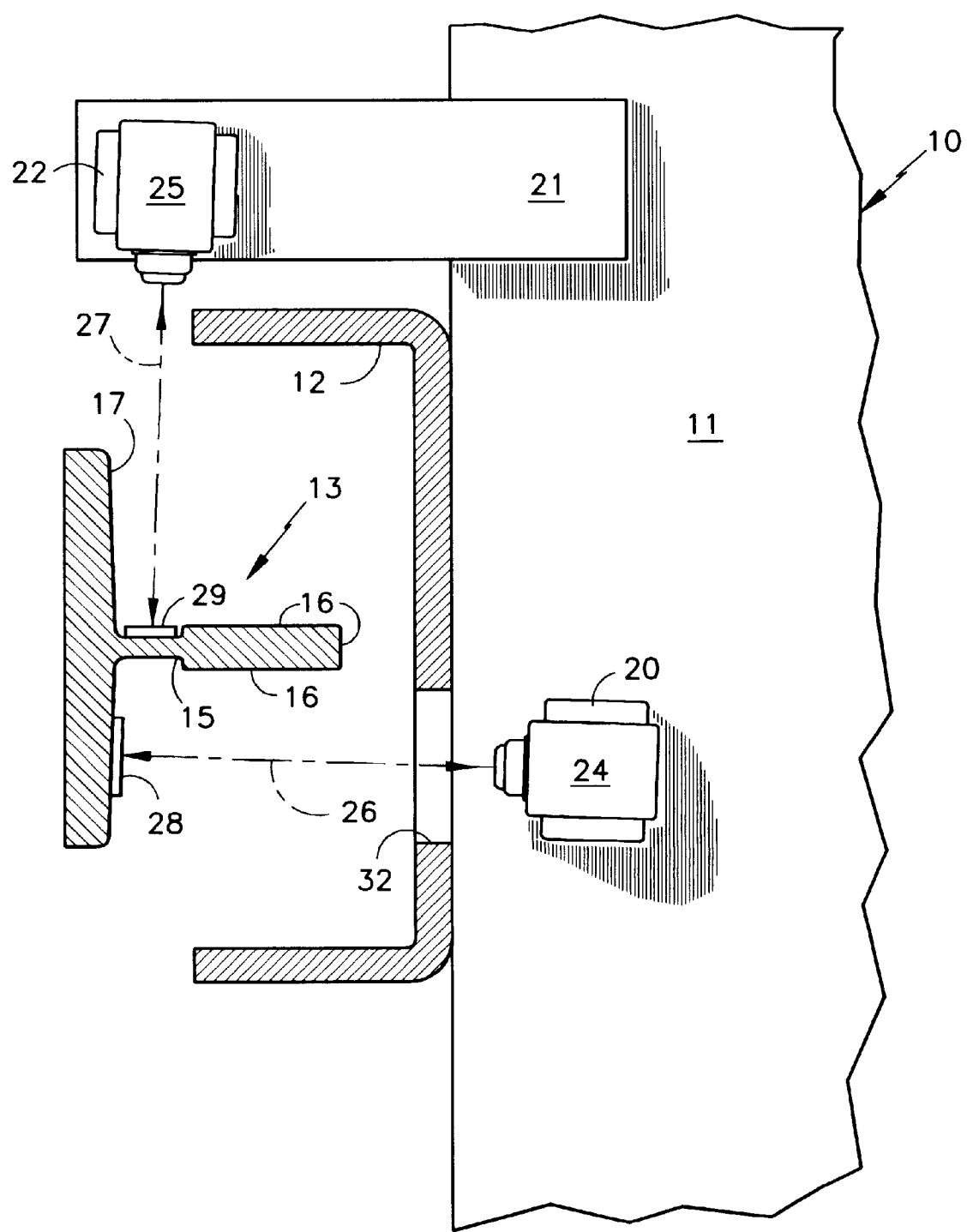

RETROREFLECTIVE ELEVATOR HOISTWAY POSITION SENSOR

TECHNICAL FIELD

This invention relates to sensing the position of an elevator within its hoistway by means of emitted radiation reflected by a retroreflective tape at a particular point along the hoistway, so as to provide a signal indicative of elevator position.

BACKGROUND ART

Elevator hoistways extend from an upper terminal landing to a lower terminal landing. Below the lower terminal landing there is a buffer, which may be comprised of springs, oil dampers or both. Elevator safety codes require that the speed of the elevator be checked as it approaches a terminal landing to ensure that the speed can be reduced to a reasonable safe speed should the elevator not come to a normal stop at the landing, but crash into the top of the hoistway or the buffer at the bottom of the hoistway. To see if the elevator is slowing down properly, switches are used to sense the position of the elevator in the hoistway to indicate a point in time when the speed of the elevator should be checked, to be sure it is slowing down. In some cases, the switches are mounted on the elevator car and are engaged by cams mounted on the guide rails; in other cases, the cam is mounted on the elevator car and various switches are mounted on the guide rails. In either case, the switches normally are operated by rotating arms which have a roller on the end, the roller engaging the cam surface.

In all of these cases, the installation of the cams or switches in the hoistway is quite costly. The hoistway switches and cams need significant maintenance. Unacceptable noise is generated when rollers engage the cams and the contacts open and close. As elevator speeds increase (such as up to 10 meters per second), the mechanical forces result in the switch equipment having to be stronger, making more noise, and requiring more frequent replacement.

DISCLOSURE OF INVENTION

Objects of the present invention include provision of a low cost, low maintenance, quiet switching arrangement for determining discreet elevator positions in a hoistway.

According to the present invention, retroreflective tape is mounted on the guide rail in an elevator hoistway, and an infrared transceiver emits an infrared light beam which reflects off the retroreflective tape back to the transceiver. According to the invention, the retroreflective tape may be applied to the side of the guide rails and sensed by a transceiver disposed outwardly from the top of the elevator cab, or the retroreflective tape may be disposed on the base of the guide rail, and sensed by a transceiver disposed on the elevator cab, as may suit any implementation of the invention.

Other objects, features and advantages of the present invention will become more apparent in the light of the following detailed description of exemplary embodiments thereof, as illustrated in the accompanying drawing.

BRIEF DESCRIPTION OF THE DRAWINGS

The sole FIGURE herein is a partially sectioned top plan view of an elevator cab, partially broken away, illustrating a pair of retroreflective transceivers according to the present invention.

BEST MODE FOR CARRYING OUT THE INVENTION

Referring to the FIGURE, an elevator car 10 having a canopy 11 and a stile 12 is shown disposed in its normal operating position next to a guide rail 13 which is secured by brackets (not shown) to the building, in the known fashion. The guide rail is T-shaped, having a stem portion 15 with three surfaces 16 against which the guide rollers run, and a base portion 17. The description thus far is conventional.

According to the invention, there is disposed on the canopy 11 by means of suitable brackets 20–22 a pair of transceivers 24, 25 which emit and receive infrared radiation 26, 27. The radiation is directed at retroreflective tape 28, 29 disposed on the base and the stem of the guide rail 13, respectively. The tape 28 may be placed at a vertical position which is different from the vertical position at which the tape 29 is placed, thereby to indicate uniquely different positions of the elevator as it is moving vertically in the hoistway. On the other hand, the tapes 28, 29 can be placed at the same vertical position on the guide rail 13 so as to provide a dual redundant system. The stile 12 may have an aperture 32 for the 20 radiation 26 to pass through. The tape may be 3M Retroreflective Tape No. 3870. The transceiver may be obtained from Pepperl and Fuchs, Twinsburg, Ohio.

The invention may be utilized to mark the spot where elevator speed is checked to ensure that it is below rated speed as required by the code when approaching a terminal landing. The invention may also be utilized to implement first slow down limits, second slow down limits, direction limits and final limits (where permitted by code) in the hoistway, if desired. Obviously, the invention can be utilized to sense the position of an elevator within a hoistway for any purpose within the resolution of the device. Only a single transceiver 24 or 25 need be used with the corresponding retroreflector tape 28 or 29, if desired. A single transceiver may be used to sense more than one reflector tape placed at similar portions (stem or base) of the guide rail but at different vertical positions therealong; other position information may be used to distinguish resulting signals, if necessary. The invention may be used with other than T-shaped guide rails. A single element of tape can be sensed redundantly by two transceivers, such as one disposed immediately above the other.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. An elevator car hoistway position sensing system, comprising:
    a retroreflective tape adhered directly to a guide rail of an elevator hoistway;
    an infrared transceiver disposed on an elevator car vertically operable in said hoistway, for emitting infrared radiation in a direction that it will impinge on said retroreflective tape when the elevator reaches a particular vertical position in said hoistway, said retroreflective tape reflecting infrared radiation back toward said transceiver, said transceiver providing a signal in response to receipt of infrared radiation, said signal being indicative of the elevator being at the position in said hoistway designated by the position of said retroreflective tape.

2. A system according to claim 1 wherein said retroreflective tape is disposed directly on the stem of said guide rail.

3. A system according to claim 1 wherein said retroreflective tape is disposed directly on the base of said guide rail.

4. A system according to claim 3 further comprising:

a second retroreflective tape disposed directly on the stem of said guide rail; and a second infrared transceiver disposed on said elevator car for emitting infrared radiation in a direction that it will impinge on said second retroreflective tape when the elevator reaches a second particular vertical position in said hoistway, said second retroreflective tape reflecting infrared radiation back toward said second transceiver, said second transceiver providing a second signal in response to receipt of infrared radiation, said second signal being indicative of the elevator being at said second position in said hoistway.

5. A system according to claim 3 wherein said second retroreflective tape is disposed at a different vertical position than the position where said first retroreflective tape is disposed.

6. A system according to claim 3 wherein said second retroreflective tape is disposed at the same vertical position as the position where said first retroreflective tape is disposed.

7. An elevator car hoistway position sensing system, comprising:

a plurality of infrared transceivers disposed on an elevator car vertically operable in an elevator hoistway;

a plurality of retroreflective tapes directly to a guide rail in said hoistway, each corresponding to one of said reflector tapes, each of said transceivers emitting infrared radiation in a direction that it will impinge on a corresponding one of said retroreflective tapes when the elevator reaches a related vertical position in said hoistway, said one retroreflective tape reflecting infrared radiation back toward said corresponding transceiver, said corresponding transceiver providing a signal in response to receipt of infrared radiation, said signal being indicative of the elevator being at a position in said hoistway designated by the position of said one retroreflective tape.

8. A system according to claim 7 wherein each of said transceivers is uniquely responsive to a single corresponding one of said retroreflective tapes.

* * * * *